(12) United States Patent
Zhuravlev

(10) Patent No.: US 10,867,169 B2
(45) Date of Patent: Dec. 15, 2020

(54) CHARACTER RECOGNITION USING HIERARCHICAL CLASSIFICATION

(71) Applicant: ABBYY Production LLC, Moscow (RU)

(72) Inventor: Aleksey Alekseevich Zhuravlev, Yaroslavl (RU)

(73) Assignee: ABBYY Production LLC, Moscow (RU)

( * ) Notice: Subject to any disclaimer, the term of this patent is extended or adjusted under 35 U.S.C. 154(b) by 242 days.

(21) Appl. No.: 16/015,639

(22) Filed: Jun. 22, 2018

(65) Prior Publication Data

US 2019/0311194 A1 Oct. 10, 2019

(30) Foreign Application Priority Data

Apr. 9, 2018 (RU) ................ 2018112554

(51) Int. Cl.
*G06K 9/00* (2006.01)
*G06K 9/62* (2006.01)
*G06N 3/08* (2006.01)

(52) U.S. Cl.
CPC ....... *G06K 9/00456* (2013.01); *G06K 9/6218* (2013.01); *G06K 9/6227* (2013.01);
(Continued)

(58) Field of Classification Search
CPC ............. G06K 9/00456; G06K 9/6267; G06K 9/6262; G06K 9/6256; G06K 9/6227;
(Continued)

(56) References Cited

U.S. PATENT DOCUMENTS 5,638,491 A 6/1997 Moed
5,835,633 A 11/1998 Fujisaki et al.
(Continued)

FOREIGN PATENT DOCUMENTS

JP 5577948 B2 8/2014
RU 2598300 C2 9/2016

OTHER PUBLICATIONS

Federal Service for Intellectual Property (FIPS), Informational Search Report for Registration No. 2018112554/08(019691, filed Sep. 4, 2018, Search completed dated Jan. 29, 2019, 2 pages (with English Translation).
(Continued)

*Primary Examiner* — Phuoc Tran
(74) *Attorney, Agent, or Firm* — Lowenstein Sandler LLP

(57) ABSTRACT

Aspects of the disclosure provide for mechanisms for character recognition using neural networks. A method of the disclosure includes assigning, using a first-level classifier of a grapheme classifier, an input grapheme image to a first grapheme cluster of a plurality of grapheme clusters, wherein the first grapheme cluster comprises a first plurality of graphemes; selecting, by a processing device, a classifier from a plurality of second-level classifiers of the grapheme classifier based on the first grapheme cluster, wherein the selected classifier is trained to recognize the first plurality of graphemes; and processing the input grapheme image using the selected classifier to recognize at least one character in the input grapheme image.

20 Claims, 9 Drawing Sheets

(52) U.S. Cl.
CPC ......... *G06K 9/6256* (2013.01); *G06K 9/6262* (2013.01); *G06K 9/6267* (2013.01); *G06N 3/08* (2013.01); *G06K 2209/01* (2013.01)

(58) Field of Classification Search
CPC ............. G06K 9/6218; G06K 2209/01; G06K 9/6268; G06N 3/08; G06N 3/0454; G06F 40/20; G06F 17/00
See application file for complete search history.

(56) References Cited

U.S. PATENT DOCUMENTS

| | | | |
|---|---|---|---|
| 6,026,177 A | 2/2000 | Mong et al. | |
| 8,761,514 B2 | 6/2014 | Park et al. | |
| 9,613,299 B2 | 4/2017 | Krivosheev et al. | |
| 10,019,716 B1* | 7/2018 | Ainslie | G06Q 30/016 |
| 2005/0232495 A1* | 10/2005 | Katoh | G06K 9/50 |
| | | | 382/225 |
| 2015/0139559 A1* | 5/2015 | Smith | G06K 9/628 |
| | | | 382/225 |

OTHER PUBLICATIONS

Federal Service for Intellectual Property (FIPS), Office Action for Application No. 2018112554/08(019691), filed Sep. 4, 2018, Office Action dated Jan. 31, 2019, 10 pages (with English Translation).

Hansen, Lars et al., "Ensemble methods for handwritten digit recognition", In Proceedings of the IEEE-SP Workshop Neural Networks for Signal Processing IEEE. DOI: 0.1109/NNSP.1992. 253679, 11 pages.

Wen, Yangdong et al., "A Discriminative Feature Learning Approach for Deep Face Recognition", Springer International Publishing AG 2016; B. Leibe et al. (Eds.): ECCV 2016, Part VII, LNCS 9911, pp. 499-515, 2016. DOI: 10.1007/978-3-319-46478-7 31, 17 pages.

Rippel, Oren et al., "Metric Learning With Adaptive Density Discrimination", Published as a conference paper at ICLR 2016, 15 pages.

Yan, Zhicheng et al., "HD-CNN: Hierarchical Deep Convolutional Neural Network for Large Scale Visual Recognition", University of Illinois at Urbana-Champaign, Carnegie Mellon University, eBay Research Lab, The University of Hong Kong; 2015, 9 pages.

Nguyen, Cong Kha et al., "Tens of Thousands of Nom Character Recognition by Deep Convolution Neural Networks", In Proceedings of the 4th International Workshop on Historical Document Imaging and Processing, Kyoto, Japan, Nov. 10-11, 2017 (HIP 2017), 5 pages.

Wang, Qingqing et al., "Similar Handwritten Chinese Character Recognition Using Hierarchical CNN Model", 2017 14th IAPR International Conference on Document Analysis and Recognition, 6 pages.

Goodfellow, Ian et al., "Deep Learning", MIT Press 2016 (Table of Contents only) 9 pages.

* cited by examiner

CHARACTER RECOGNITION USING HIERARCHICAL CLASSIFICATION

REFERENCE TO RELATED APPLICATIONS

This application claims priority to Russian Patent Application No. 2018112554, filed Apr. 9, 2018, the entire contents of which are hereby incorporated by reference herein.

TECHNICAL FIELD

The implementations of the disclosure relate generally to computer systems and, more specifically, to systems and methods for recognizing text in an image using hierarchical classification.

BACKGROUND

Recognizing text in an image is one of the important operations in automated processing of images of natural language texts. Identifying graphemes from an image can be performed using deep neural networks. However, character recognition for languages with large alphabets may be a challenging task. For example, some languages (e.g., Japanese, Chinese, etc.) may have an alphabet of more than 20000 different graphemes. A neural network capable of recognizing more than 20000 graphemes may be large and have a very complex architecture. Using a single neural network to recognize these graphemes may be time-consuming and may produce poor quality results. It may also be difficult to train a neural network to recognize all graphemes of a language with a large alphabet.

SUMMARY OF THE DISCLOSURE

Embodiments of the present disclosure describe character recognition using neural networks. A method of the disclosure includes assigning, using a first-level classifier of a grapheme classifier, an input grapheme image to a first grapheme cluster of a plurality of grapheme clusters, wherein the first grapheme cluster comprises a first plurality of graphemes; selecting, by a processing device, a classifier from a plurality of second-level classifiers of the grapheme classifier based on the first grapheme cluster, wherein the selected classifier is trained to recognize the first plurality of graphemes; and processing the input grapheme image using the selected classifier to recognize at least one character in the input grapheme image.

A system of the disclosure includes: a memory; and a processing device operatively coupled to the memory, the processing device to: assign, using a first-level classifier of a grapheme classifier, an input grapheme image to a first grapheme cluster of a plurality of grapheme clusters, wherein the first grapheme cluster comprises a first plurality of graphemes; select a classifier from a plurality of second-level classifiers of the grapheme classifier based on the first grapheme cluster, wherein the selected classifier is trained to recognize the first plurality of graphemes; and process the input grapheme image using the selected classifier to recognize at least one character in the input grapheme image.

A non-transitory machine-readable storage medium of the disclosure includes instructions that, when accessed by a processing device, cause the processing device to: assign, using a first-level classifier of a grapheme classifier, an input grapheme image to a first grapheme cluster of a plurality of grapheme clusters, wherein the first grapheme cluster comprises a first plurality of graphemes; select a classifier from a plurality of second-level classifiers of the grapheme classifier based on the first grapheme cluster, wherein the selected classifier is trained to recognize the first plurality of graphemes; and process the input grapheme image using the selected classifier to recognize at least one character in the input grapheme image.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
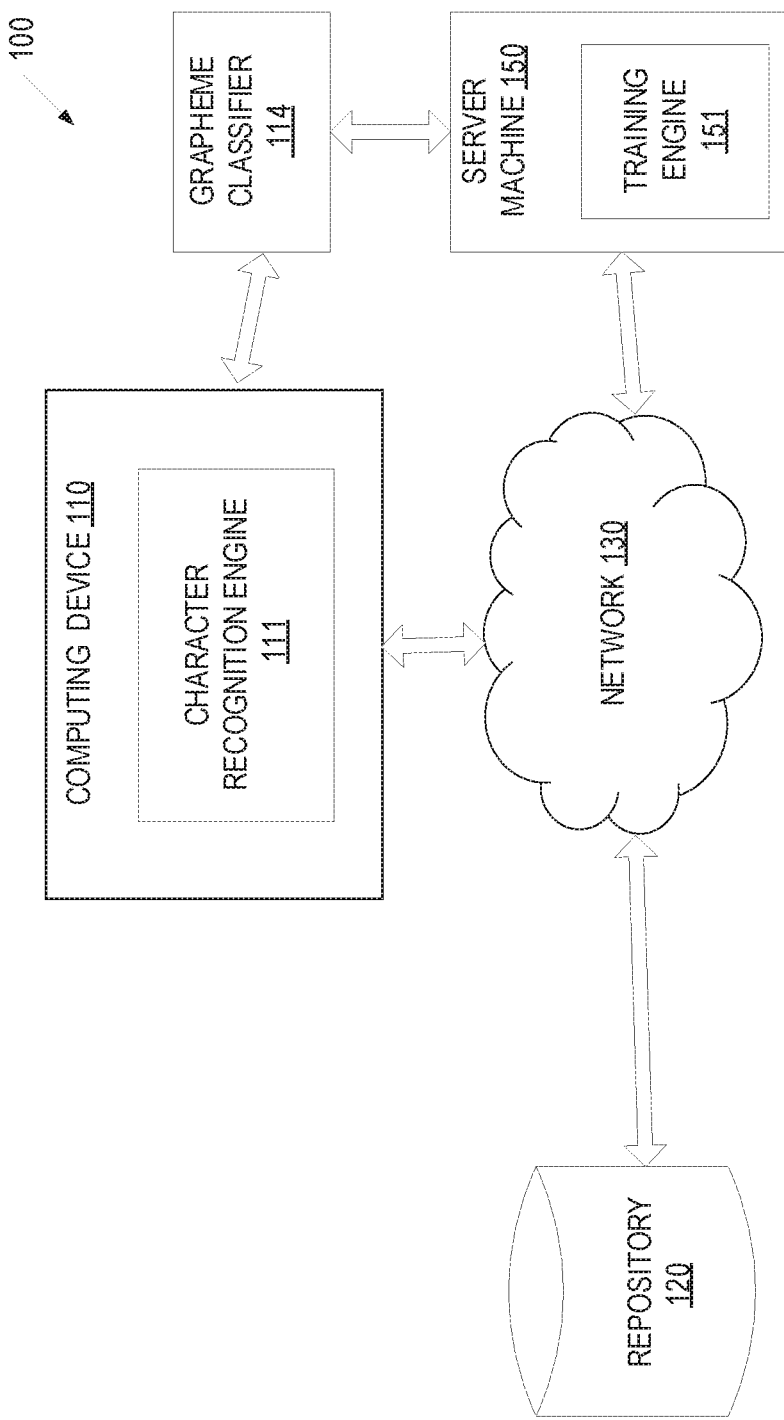
FIG. 1 is an example of a computer system in which implementations of the disclosure may operate.

Character recognition may involve recognizing text in an image using classifiers. Conventional character recognition mechanisms fail to provide classifiers suitable for recognizing text in languages with large alphabets. For example, the Japanese alphabet may include more than 20000 graphemes. To perform character recognition for Japanese text, the conventional character recognition mechanisms may have to construct a neural network capable of recognizing all of the graphemes. The neural network may be large and may have a very complex architecture. The conventional character recognition mechanisms also fail to provide classifiers suitable for recognizing multilingual texts. For example, to recognize multilingual texts in an image, the conventional character recognition mechanisms may have to train a respective classifier for each of a plurality of languages. As such, using the conventional character recognition mechanism to perform character recognition may be time-consuming and may produce poor quality results.

Aspects of the disclosure address the above noted and other deficiencies by providing mechanisms for character recognition using hierarchical classification. The mechanisms can automatically divide graphemes of one or more languages into a plurality of clusters (also referred to as the "grapheme clusters"). As referred to herein, a grapheme may represent the smallest recognizable unit in a writing system of a given language (or set of similar languages). A grapheme can include alphabetic letters, typographic ligatures, Chinese characters, numerical digits, punctuation marks, or other individual symbols or characters. In some embodiments, the mechanisms can divide the graphemes by clustering training images including the graphemes into the grapheme clusters using a neural network. The automatic division of the graphemes makes the mechanisms disclosed herein applicable to any language and to multilingual recognition.

The mechanisms can train a grapheme classifier to recognize the graphemes utilizing the grapheme clusters. The grapheme classifier may include a plurality of levels. Each of the levels of the grapheme classifier may include a neural network. In some embodiments, the grapheme classifier can include a network selector trained to recognize the grapheme clusters. The network selector may operate as a first-level classifier of the grapheme classifier. The grapheme classifier can also include a plurality of second-level classifiers trained to recognize the graphemes of the grapheme clusters. For example, a respective differential classifier may be trained to recognize the graphemes of a respective grapheme cluster of the grapheme clusters. The combination of the first-level classifier and the second-level classifiers may operate as the grapheme classifier in accordance with the present disclosure. Upon receiving an input grapheme image for content recognition (e.g., grapheme recognition), the grapheme classifier can assign the input grapheme image to one of the grapheme clusters using the first-level classifier (also referred to as the "first grapheme cluster"). A second-level classifier that is trained to recognize the graphemes of a particular grapheme cluster may then be selected to process the input image. The selected second-level classifier can recognize one or more graphemes in the input grapheme image. As referred to herein, a grapheme image may be any image including one or more graphemes.

Accordingly, the mechanisms disclosed here provide a grapheme classifier that can perform character recognition using hierarchical classification. Each level of the grapheme classifier disclosed herein may include a neural network that has a relatively simple architecture. Compared to the conventional character recognition mechanisms that use one large neural network to recognize all graphemes of an alphabet of a language, the mechanisms disclosed herein use several simple neural networks to recognize graphemes of one or more languages, resulting in efficient and accurate character recognition for languages with large alphabets and multilingual language texts.

FIG. 1 is a block diagram of an example of a computer system 100 in which implementations of the disclosure may operate. As illustrated, system 100 can include a computing device 110, a repository 120, and a server device 150 connected to a network 130. Network 130 may be a public network (e.g., the Internet), a private network (e.g., a local area network (LAN) or wide area network (WAN)), or a combination thereof.

The computing device 110 may be a desktop computer, a laptop computer, a smartphone, a tablet computer, a server, a scanner, or any suitable computing device capable of performing the techniques described herein. In some embodiments, the computing device 110 can be and/or include one or more computing systems 800 of FIG. 8.

In one embodiment, computing device 110 may include a character recognition engine 111. The character recognition engine 111 may include instructions stored on one or more tangible, machine-readable storage media of the computing device 110 and executable by one or more processing devices of the computing device 110. In one embodiment, the character recognition engine 111 may use a grapheme classifier 114 for character recognition. The grapheme classifier 114 is trained and used to identify graphemes of an input image. The character recognition engine 111 may also preprocess any received images prior to using the images for training of the grapheme classifier 114 and/or applying the grapheme classifier 114 to the images. In some instances, the grapheme classifier 114 may be part of the character recognition engine 111 or may be accessed on another machine (e.g., server machine 150) by the character recognition engine 111.

The character recognition engine 111 may be a client-based application or may be a combination of a client component and a server component. In some implementations, character recognition engine 111 may execute entirely on the client computing device such as a tablet computer, a smart phone, a notebook computer, a camera, a video camera, or the like. Alternatively, a client component of character recognition engine 111 executing on a client computing device may receive a document image and transmit it to a server component of the character recognition engine 111 executing on a server device that performs the grapheme classification. The server component of the character recognition engine 111 may then return a recognition result (e.g., one or more recognized characters and/or graphemes) to the client component of the character recognition engine 111 executing on the client computing device for storage or to provide to another application. In other implementations, character recognition engine 111 may execute on a server device as an Internet-enabled application accessible via a browser interface. The server device may be represented by one or more computer systems such as one or more server machines, workstations, mainframe machines, personal computers (PCs), etc.

Server machine 150 may be and/or include a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a training engine 151. The training engine 151 can construct the grapheme classifier 114 for character recognition. The grapheme classifier 114 as illustrated in FIG. 1 may refer to model artifacts that are created by the training engine 151 using training data that includes training inputs and corresponding target outputs (correct answers for respective training inputs). Features of the training data that may be used to map the training input to the target output (the correct answer) can be found, and may be subsequently used by the grapheme classifier 114 for future predictions. The grapheme classifier 114 may be a hierarchical classifier including a plurality of neutral networks. Each of the plurality of neutral networks may be regarded as being a level of the grapheme classifier. In some embodiments, the grapheme classifier 114 may include a first-level classifier, one or more second-level classifiers, one or more additional-level classifiers (e.g., third-level classifiers, etc.).

To construct the grapheme classifier 114, the training engine 151 can train an initial classifier that is capable of recognizing a plurality of graphemes. The initial classifier is not part of the grapheme classifier 114 in some embodiments. In one implementation, the plurality of graphemes may represent an alphabet of a particular language (e.g., all of the graphemes of the alphabet). In another implementation, the plurality of graphemes may represent multiple alphabets of multiple languages. Each of the graphemes may also be referred to as a grapheme class and may be associated with a grapheme identifier. The grapheme identifier may include any suitable information that can be used to identify the grapheme class and/or the grapheme, such as a description of the grapheme class and/or the grapheme. The trained initial classifier can determine a grapheme identifier for an input grapheme image and can classify the input grapheme image into a grapheme class associated with the determined grapheme identifier.

The training engine 151 can generate first training data to train the initial classifier. The first training data may include one or more training inputs and one or more target outputs. The first training data may also include mapping data that maps the training inputs to the target outputs. The training inputs may include a first training set of grapheme images. Each of the grapheme images in the first training set may be an image including a known grapheme. The training outputs may be grapheme identifiers specifying the known graphemes included in the first training set of grapheme images. For example, a first training grapheme image in the first training set may include a first known grapheme (e.g., "H"). The first training grapheme image may be a first training input that can be used to train the initial classifier. A first grapheme identifier representing the first known grapheme may be the target output corresponding to the first training input. During the training of the initial classifier, the training engine 151 can determine features of the first training data that can be used to map the training inputs to the target outputs (e.g., the grapheme identifier to be predicted). The features can be subsequently used by the initial classifier for future predictions. For example, upon receiving an input image of an unknown grapheme, the trained initial classifier can predict a grapheme to which the input image belongs and can output a predicted grapheme identifier that identifies the predicted grapheme as an output.

In some embodiments, the training engine 151 can train the initial classifier as one or more convolutional neural networks. Convolutional neural networks may include architectures that may provide efficient image recognition. Convolutional neural networks may include several convolutional layers and subsampling layers that apply filters to portions of the image of the text to detect certain features. A convolutional neural network may perform a convolution operation, which multiplies each image fragment by filters (e.g., matrices) element-by-element and sums the results in a similar position in an output array.

The initial classifier may include multiple layers. A grapheme image may be supplied to a first layer of the initial classifier as an input image. The input image may be processed by the layers of the initial classifier. The penultimate layer of the initial classifier may include multiple nodes. Each of the nodes of the penultimate layer may correspond to one of the features used by the initial classifier to recognize the grapheme. The number of the nodes of the penultimate layer may equal the number of the features. The output of the penultimate layer may be a feature vector representative of features of the input image. The last layer of the initial classifier (e.g., a fully-connected layer) may include a plurality of nodes. Each of the nodes of the last layer may correspond to a network response for a known grapheme. The output of the initial classifier may be a class or probabilities of the classes that best describe the input image. The trained initial classifier can identify features for each grapheme image (as computed by a neural network), which can be later used to be able to arrange classes with close values of features in one cluster. The training of the initial classifier is further discussed below in connection with FIG. 2.

Figure 2:
FIG. 2 is a schematic diagram illustrating an example of convolutional neural networks (CNN) in accordance with some embodiments of the present disclosure.
Figure 2:
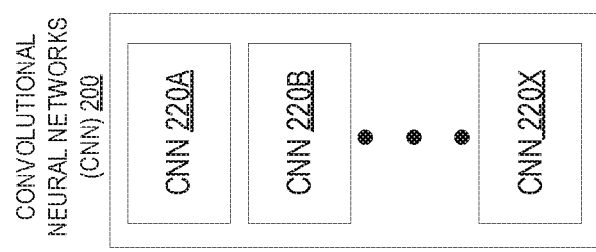

Referring back to FIG. 1, the training engine 151 can generate a feature extractor based on the initial classifier. For example, the training engine 151 can remove the last layer of the initial classifier (e.g., the output layer of CNN 220 as illustrated in FIG. 2) from the initial classifier and use the resulted neural network as the feature extractor. The penultimate layer of the initial classifier may be an output layer of the feature extractor that produces an output (e.g. a feature vector) of the feature extractor. The training engine 151 can then generate a plurality of feature vectors using the feature extractor. Each of the feature vectors can represent one or more features of a grapheme to be recognized by the grapheme classifier 114. In some embodiments, a respective feature vector can be generated for each of the grapheme classes using the feature extractor. For example, the training engine 151 may select a training grapheme image assigned to a particular grapheme class as a representative grapheme image of the grapheme class. The training engine 151 can process the representative grapheme image using the feature extractor. The feature extractor then produces a feature vector based on the representative grapheme image. As another example, the training engine 151 can obtain a plurality of training grapheme images assigned to a particular grapheme class. More particularly, for example, the training engine 151 can identify a plurality of training grapheme images associated with a grapheme identifier that identifies the particular grapheme class. The training engine 151 can then use the feature extractor to process the plurality of training grapheme images to generate a plurality of initial feature vectors. The processing device can then generate a feature vector for the respective grapheme class (e.g., by determining an average value of the initial feature vectors). This may give a more generalized result that takes into account possible variations in training images representing the graphemes representations. As still another example, the training engine 151 can use the directions of the feature vectors from the last layer of the initial classifier as the feature vectors.

The training engine 151 can cluster the feature vectors to generate a first plurality of sets of graphemes (also referred to the "first plurality of grapheme clusters"). The clustering may be performed using any suitable clustering algorithm, such as the k-means method. Each of the first plurality of grapheme clusters may include a set of graphemes that are regarded as being similar to each other (e.g., graphically similar to each other). In some embodiments, the feature vectors clustered into a particular grapheme cluster may be regarded as being more similar to each other than to those in other grapheme clusters. The training engine 151 can cluster graphemes having feature vectors that are directed in the same direction or approximately the same direction in one grapheme cluster.

The training engine 151 can assign each of the training grapheme images of the first training set to one of the grapheme clusters (e.g., by associating a cluster ID of a cluster with each of the grapheme images). The network selector can be trained on an architecture that is simpler than the architecture used to train the initial classifier, and may thus provide a high rate of recognition.

The training engine 151 can train a network selector to recognize the first plurality of grapheme clusters. The network selector may be trained as a neural network. The training engine 151 can generate second training data to train the network selector. The second training data may include one or more training inputs and one or more target outputs. The second training data may also include mapping data that maps the training inputs to the target outputs. The training inputs may include the first training set of grapheme images. The training outputs may be the first plurality of grapheme clusters. For example, the first training grapheme image in the first training set may include the first known grapheme (e.g., "H") that is clustered in a first grapheme cluster of the first plurality of grapheme clusters. The first training grapheme image may be a first training input that can be used to train the network selector. The first grapheme cluster may be the target output corresponding to the first training input. During the training of the network selector, the training engine 151 can determine features of the second training data that can be used to map the training inputs to the target outputs (e.g., the grapheme clusters to be predicted). The features can be subsequently used by the network selector for future predictions. For example, upon receiving an input image of an unknown grapheme, the trained network selector can predict a grapheme cluster to which the input image belongs based on the features and can output the predicted grapheme cluster as an output.

The training engine 151 can process a second training set of grapheme images using the trained network selector. For example, the network selector can classify the second training set of grapheme images into one or more of the first plurality of grapheme clusters. The second training set of grapheme images may include one or more training grapheme images. Each of the training grapheme images of the second training set may include one or more known graphemes. The second training set of grapheme images may be different from the first training set of grapheme images in some embodiments.

The training engine 151 can also collect statistical data about the processing of the second training set of grapheme images by the network selector. The statistical data may include any suitable data about the processing of the second training set of grapheme images by the network selector. For example, the statistical data may include data about an erroneous assignment of a particular training grapheme image in the second training set (e.g., a second training grapheme image) to a particular grapheme cluster of the first plurality of cluster graphemes. The second training grapheme image may be regarded as being erroneously assigned to the particular grapheme cluster when the particular grapheme cluster comprises a set of graphemes that do not include the known grapheme included in the second training grapheme image. The statistical data may include the number of erroneous assignments of training grapheme images related to a certain grapheme to the particular grapheme cluster, an error rate of the erroneous assignments (e.g., a ratio of the erroneous assignments to the total number of training grapheme images including the particular grapheme), etc.

The training engine 151 can generate a second plurality of sets of graphemes based on the first plurality sets of graphemes and the statistical data. For example, the training engine 151 can expand a first set of graphemes of the first plurality sets of graphemes to include one or more additional graphemes based on the statistical data. In one implementation, the training engine 151 can determine a rate of images of a given grapheme erroneously assigned to the first set of graphemes based on the statistical data (e.g., by determining a percentage of training grapheme images of the given grapheme erroneously assigned to the first set of graphemes by the network selector). The training engine 151 can further determine that the rate is greater than a threshold.

Figure 7:
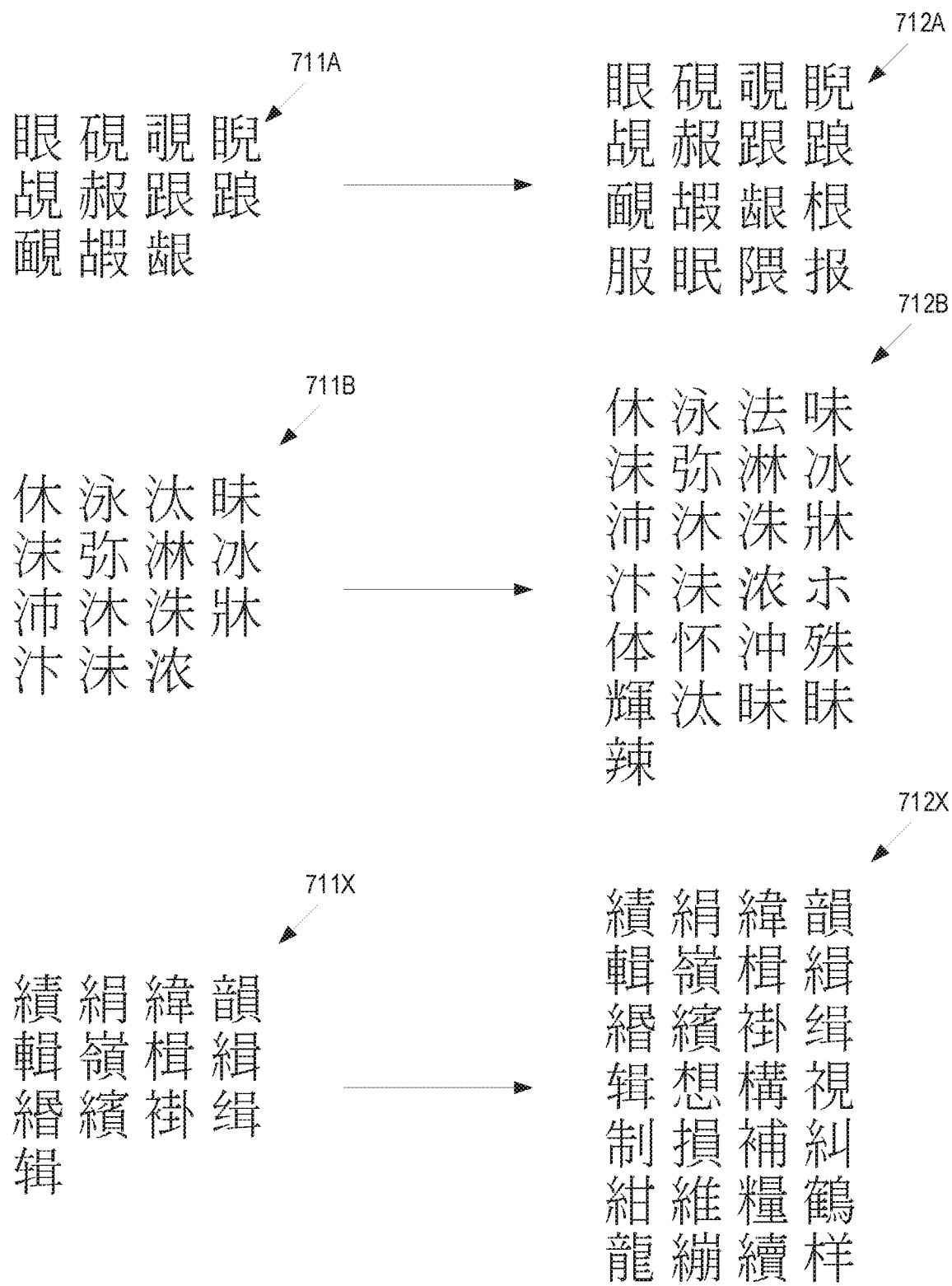
FIG. 7 illustrates examples of initial grapheme clusters and expanded grapheme clusters in accordance with one implementation of the present disclosure.

The training engine 151 can then add the given grapheme into the first set of graphemes to generate an expanded set of graphemes. The expanded set of graphemes may be designated as a grapheme cluster. Multiple expanded sets of graphemes may be generated based on the first plurality sets of graphemes and the statistical data in this manner. For example, as illustrated in FIG. 7, grapheme clusters 711A, 711B, and 711X may be expanded to expanded grapheme clusters 712A, 712B, and 712X, respectively. The training engine 151 can designate the expanded sets of graphemes as a second plurality of grapheme clusters. By expanding the first plurality of sets of grapheme to the second plurality of sets of graphemes, the training engine 151 generates intersecting grapheme clusters (the second plurality of grapheme clusters) that may be used to train a next level of the grapheme classifier 114 (e.g., a second level of the grapheme classifier 114). This may significantly increase the final quality of recognition results provided by the grapheme classifier 114.

The training engine 151 can also train one or more second-level differential classifiers of the grapheme classifier. Each of the second-level differential classifiers can recognize graphemes within one of the second plurality of grapheme clusters. In some embodiments, the second-level classifiers may be trained by training a respective differential classifier for each of the second plurality of sets of graphemes. For example, the training engine 151 can generate third training data to train a second-level classifier to recognize graphemes of a given grapheme cluster. The third training data may include one or more training inputs and one or more target outputs. The third training data may also include mapping data that maps the training inputs to the target outputs. The training inputs may be training grapheme images including the graphemes of the given grapheme cluster. The training outputs may be the graphemes of the given grapheme cluster. For example, the first training grapheme image in the first training set may include the first known grapheme (e.g., "H") that is clustered in a first grapheme cluster. The first training grapheme image may be a first training input that can be used to train a second-level classifier. The first grapheme may be the target output corresponding to the first training input. During the training of the second-level classifier, the training engine 151 can determine features of the training data that can be used to map the training inputs in the third training data to the target outputs (e.g., the graphemes of the given grapheme cluster to be predicted). The features can be subsequently used by the second-level classifier for future predictions. For example, upon receiving an input image of an unknown grapheme, the trained second-level classifier can predict a grapheme of the given grapheme cluster and can provide the predicted grapheme as an output.

Accordingly, each level of the grapheme classifier 114 may include a neural network that has a relatively simple architecture. Compared to the conventional character recognition mechanisms that use one large neural network to recognize all graphemes of an alphabet of a language, the grapheme classifier 114 use several simple neural networks to recognize graphemes of one or more languages, resulting in efficient and accurate character recognition for languages with large alphabets and multilingual language texts.

In some embodiments, the training engine 151 can train the grapheme classifier 114 by performing one or more operations described in connection with FIGS. 3 and 4. The grapheme classifier 114 can implement a two-level classification model as described in connection with FIG. 6A.

In some embodiments, one or more additional levels of the grapheme classifier 114 may be constructed. For example, the training engine 151 can determine that a two-level grapheme classifier does not provide the desired recognition quality of recognition results or processing speed, the training engine 151 can replace one or more of the second-level classifiers with a multilayer classifier that implement a nested tier classification scheme (e.g., a classifier 700 of FIG. 6B). In one implementation, the training engine 151 can replace a second-level classifier with such a multilayer classifier in response to determining that the second-level classifier is trained to recognize a grapheme cluster of a threshold number of graphemes (e.g., a number of graphemes that are greater than a threshold value). In such implementation, the second training set of grapheme images can be used to test the quality of recognition of an automatically constructed hierarchical classifier. As will be described in more detail in connection with FIG. 6B, one or more classifiers may be replaced by a multplayer classifier by performing the process described above iteratively. In this way, the hierarchical classifier for character recognition can be built automatically.

The character recognition engine 111 may receive an input grapheme image and recognize one or more graphemes in the input grapheme image. The input grapheme image may be any image including one or more unknown graphemes (e.g., graphemes to be recognized using a grapheme classifier disclosed herein). The input grapheme image may be received by the character recognition engine 111 as a portion of a document image, or as a single grapheme image from a client device or an application that communicates with computing device 110. Character recognition engine 111 may then invoke the grapheme classifier 114 to recognize one or more graphemes in the grapheme image. The first-level classifier of the grapheme classifier 114 may assign the input grapheme image to a grapheme cluster. The character recognition engine 111 can select from the second-level classifiers, a classifier that is trained to recognize the set of graphemes of the grapheme cluster. The selected classifier can process the input grapheme image to recognize one or more graphemes in the input grapheme image.

In some embodiments, character recognition engine 111 can use the grapheme classifier 114 to predict various recognition results (e.g., hypothesis) for the input grapheme image. Each of the recognition result may include one or more characters recognized by the character recognition engine 111. In some implementations, character recognition engine 111 may identify a set of target characters that are most similar to the input grapheme image. In one embodiment, character recognition engine 111 may determine one or more target characters that have graphical characteristics or features that are similar to the input grapheme image and assign those target characters to the set of recognition results.

In some implementations, grapheme classifier 114 may determine a confidence level for each of the recognition results. In one embodiment, the confidence level for each of the recognition results may be a probability percentage value for the recognized grapheme. For example, if grapheme classifier 114 analyzed a grapheme in the input grapheme image and determined that there was a 70% probability that the grapheme in the input grapheme image was a "C", the associated confidence level may be represented by the 70% value. In some embodiments, the grapheme classifier 114 (or character recognition engine 111 upon obtaining the output of grapheme classifier 114) can rank the recognition results based on the confidence levels associated with the recognition results. The grapheme classifier 114 or character recognition engine 111 can also generate a sorted list of the recognition results based on the ranking (sorting the recognition results in descending confidence level). The recognition results can be presented (e.g., displayed) on a display in some embodiments.

The repository 120 is a persistent storage that is capable of storing documents and/or images 141 as well as data structures to perform character recognition in accordance with the present disclosure. Repository 120 may be hosted by one or more storage devices, such as main memory, magnetic or optical storage based disks, tapes or hard drives, NAS, SAN, and so forth. Although depicted as separate from the computing device 110, in an implementation, the repository 120 may be part of the computing device 110. In some implementations, repository 120 may be a network-attached file server, while in other embodiments content repository 120 may be some other type of persistent storage such as an object-oriented database, a relational database, and so forth, that may be hosted by a server machine or one or more different machines coupled to the via the network 130. The repository 120 may store training data in accordance with the present disclosure.

FIG. 2 is a schematic diagram illustrating an example 200 of convolutional neural networks (CNN) in accordance with some embodiments of the present disclosure. The CNN 200 may be used to train the initial classifier, the network selector, the second-level classifiers and/or additional-level classifiers as described in connection with FIG. 1.

As illustrated, CNN 200 can include one or more convolutional neural networks (CNN) (e.g., CNN 220A, 200B, . . . , and 220X). Each of CNN 220A through 220X may be a specialized neural network architecture directed to efficient image recognition. Each CNN may include a sequence of layers, where each layer is of a different type. The layers may include, for example, convolutional layers, pooling layers, rectified linear unit (ReLU) layers, and fully connected layers, each of which perform a particular operation in recognizing text in an image. In some embodiments, each layer of the CNN may be a different type than the immediately preceding layer and the immediately following layer. The output of one layer may be provided as the input to the next layer.

In some embodiments, each of CNN 220A through 220X may be and/or include a CNN 200. As illustrated, CNN 220 may include an input layer 221, one or more convolutional layers 223A-223B, ReLU layers 225A-225B, pooling layers 227A-227B, and an output layer 229.

In some embodiments, an original image may be received by input layer 221 and may be passed through a series of layers of CNN 220 for processing. For example, each of the convolution layers of CNN 220 can perform a convolution operation that may involve multiply each image position of the original image by one or more filters (e.g., matrices of convolution), element-by-element, and the result is summed and recorded in a similar position of an output array. More particularly, for example, convolutional layers 223A can multiply the pixel value of the original image by the values of one or more filters. Each of the filters may be a pixel matrix having certain sizes and values. Each of the filters may detect a certain feature. Filters are applied to positions traversed throughout the original. For example, a first position may be selected and the filters may be applied to the upper left corner and the values of each filter may be multiplied by the original pixel values of the original image (element multiplication) and these multiplications may be summed, resulting in a single number. The filters may be shifted through the original image to the next position in accordance with the convolution operation and the convolution process may be repeated for the next position of the original. Each unique position of the original image may produce a number upon the one or more filters being applied. After the one or more filters pass through every position, a matrix is obtained, which is referred to as a feature map. The feature map may be smaller than the original image. In some embodiments, each filter may generate a feature map. For example, if 16 filters are used in the layer, then 16 feature maps may be generated.

The output of the convolutional layer (e.g., convolutional layer 223A) may be provided to a ReLU layer (e.g., ReLU layer 225A) as an input of the ReLU layer. The ReLU layer may utilize a non-linear model to process the output of the convolutional layer. For example, the ReLU can apply an activation function, which may replace negative numbers by zero, and may leave the position numbers unchanged.

The information obtained by the convolution operation and the application of the activation function may be stored and transferred to the next layer in CNN 220. For example, the ReLU layer 225A may pass the information as input to the pooling layer 227A. The pooling layer 227A may perform a subsampling operation to decrease the discretization of spatial dimensions (width and height), as a result of which the size of the feature maps decrease.

Further, the pooling layer 227A may perform non-linear compression of the feature maps. For example, if some features have already been revealed in the previous convolution operation, then a detailed image is no longer needed for further processing, and it is compressed to less detailed pictures. In the subsampling layer, when a filter is applied to the original image, no multiplication may be performed. Instead, a simpler mathematical operation is performed, such as searching for the largest number in the position of the original being evaluated. The largest number found is entered in the feature maps, and the filter moves to the next position and the operation repeats until the end of the original is reached.

The output from the pooling layer 227A may be provided as input to the convolutional layer 223B. The processing of the original image using the CNN 220 may continue applying each successive layer until every layer has performed its respective operation. As illustrated in FIG. 2, the CNN 220 can include alternating convolutional layers and pooling layers. These alternating layers may enable creation of new feature maps of reduced sizes. For example, a new feature map may be generated on each next layer with a reduced size and an increased number of channels. In some embodiments, the penultimate layer of the CNN 220 may generate a number of feature maps of a desired size (e.g., a 1×1 matrix). Each of the feature maps may correspond to one of a plurality of features of the original image that can be used to recognize a grapheme. The number of the feature maps may be the same as the number of the features. The output of the penultimate layer may be a feature vector representative of the features of the original image. For example, in some embodiments in which 512 features are used to recognize the grapheme, the feature vector may be a 512-dimensional vector (an array of 1×1×512 given that each of the feature maps is a 1×1 matrix). The feature vector may be regarded as a representation of the grapheme.

The feature vector may be provided as input to the output layer 229. The output layer 229 may be the last layer of the CNN 220. The output layer 229 can be a fully-connected layer in some embodiments. The output layer 229 may include a plurality of nodes. Each of the nodes of the output layer 229 may correspond to a response for one or more graphemes to be recognized by the CNN 220. The output layer 229 can generate an N-dimensional vector (N being the number of grapheme classes) that can be used to classify the original image into a grapheme class. For example, if in an alphabet of 20,000 grapheme, 20,000 grapheme classes), a fully connected layer can translate the feature vector provided by the penultimate layer (e.g., a 1×1×512 vector) into a vector of 1×1×20000, where each of the dimension of the vector corresponds to a grapheme class (e.g., a grapheme). The output layer 229 may generate an output indicative of the classification of the original image into the grapheme identifier (e.g., a grapheme). The output of the final layer may be a grapheme associated with the original image, probabilities of e grapheme that may describe the original image, etc.

While a certain number of layers of CNN 220 are illustrated in FIG. 2, this is merely illustrative. CNN 220 can include any suitable number of convolutional layers, ReLU layers, pooling layers, and/or any other layers. The order of the layers, the number of the layers, the number of filters, and/or any other parameter of the CNN 220 can be adjusted (e.g., based empirical data).

Figure 3:
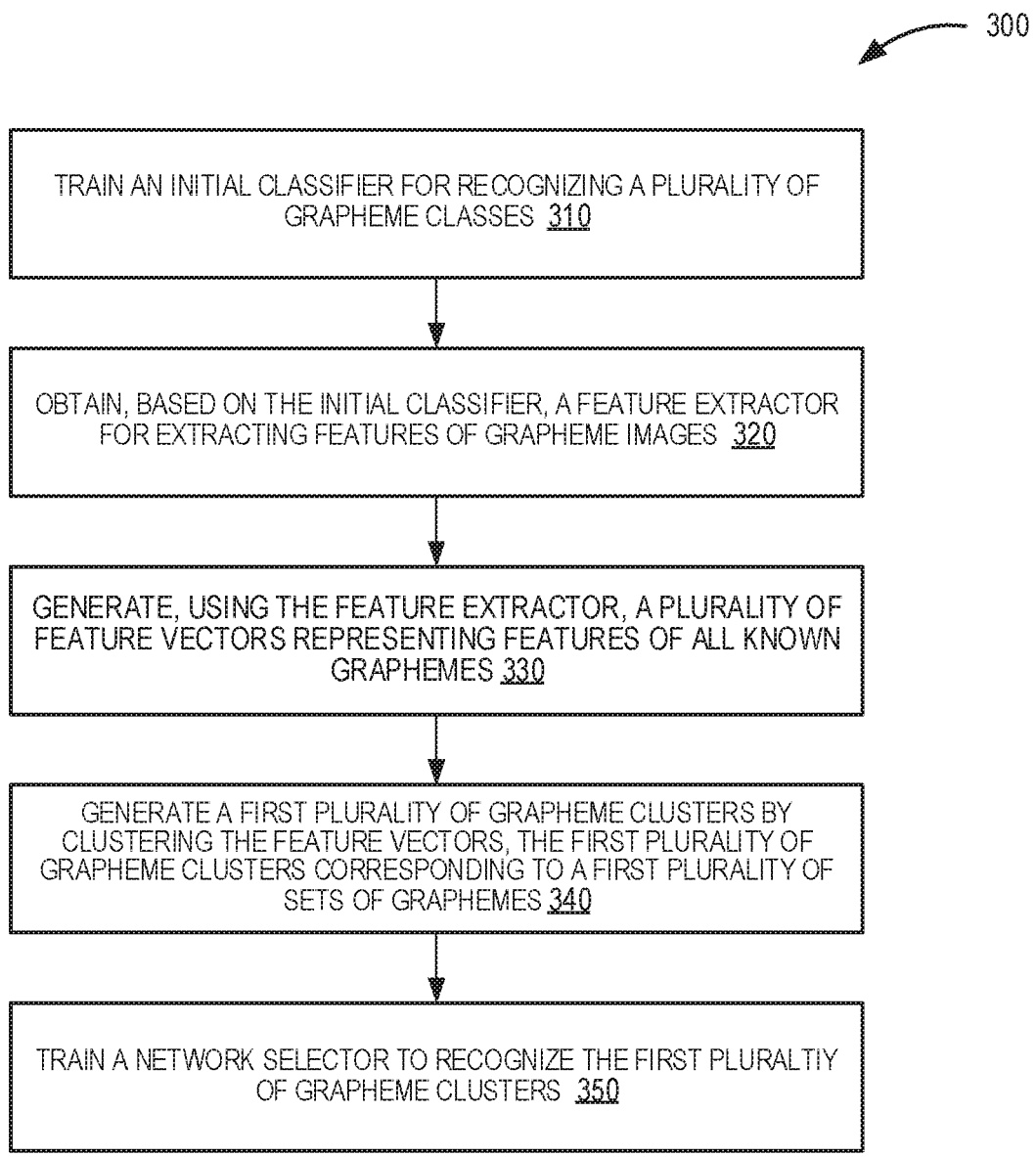
FIG. 3 is a flow diagram illustrating a method for training a first layer of a grapheme classifier according to an implementation of the disclosure.
Figure 4:
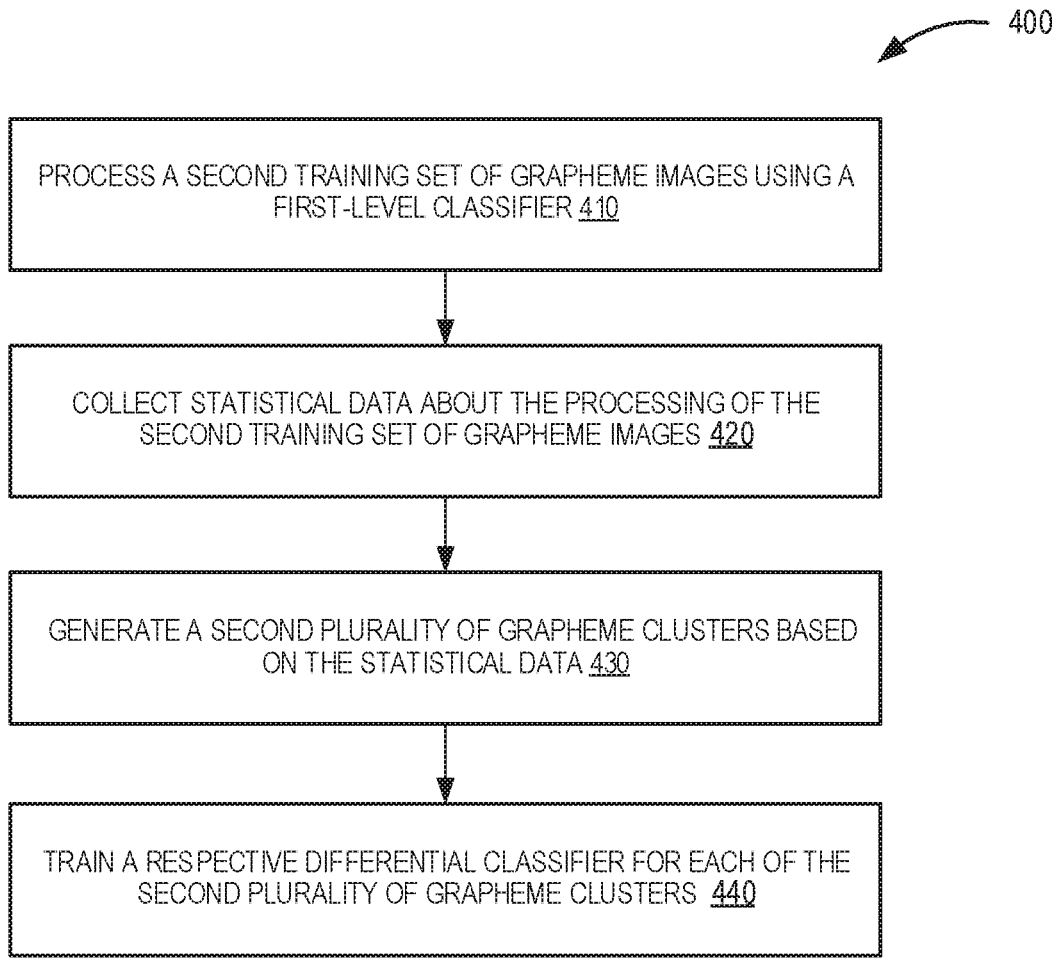
FIG. 4 is a flow diagram illustrating a method for training a second layer of a grapheme classifier according to an implementation of the disclosure.
Figure 5:
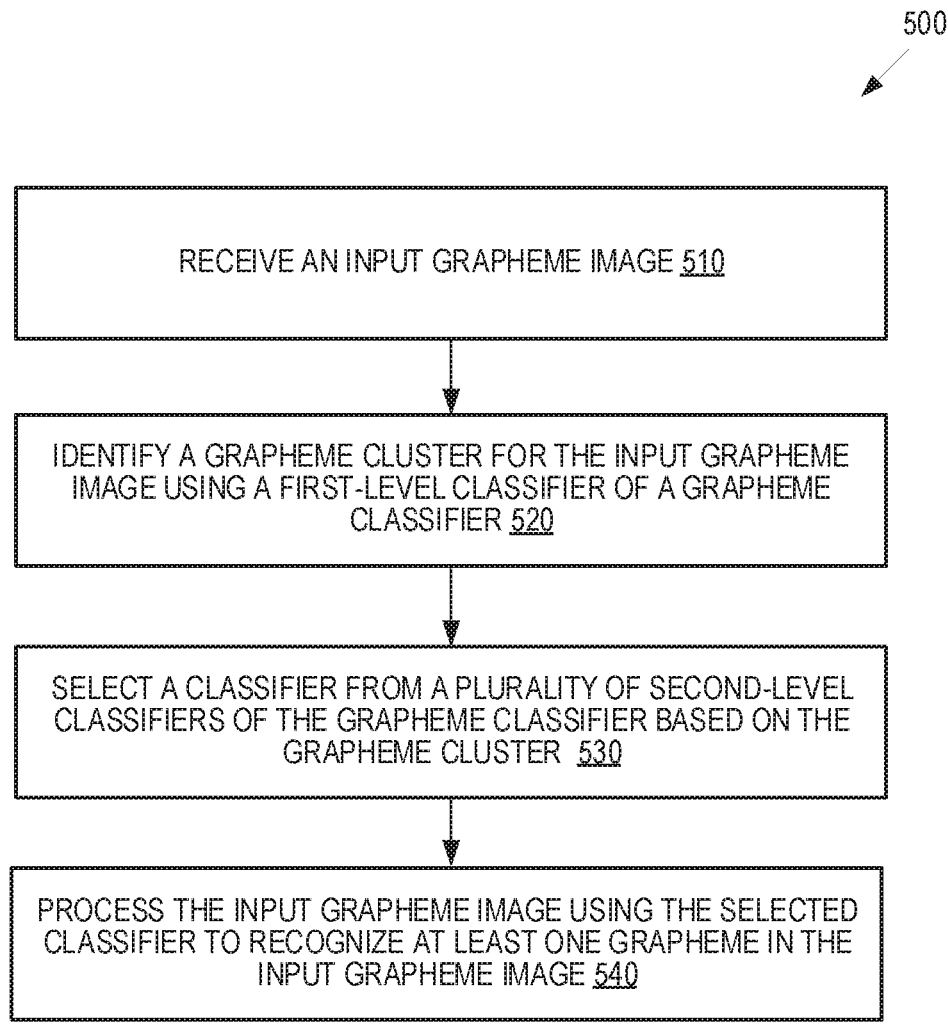
FIG. 5 is a flow diagram illustrating a method for character recognition using a grapheme classifier according to some implementations of the disclosure.

FIGS. 3 and 4 are flow diagrams illustrating method 300 and 400 for training a grapheme classifier for character recognition according to some implementations of the disclosure. FIG. 5 is a flow diagram illustrating a method 500 for character recognition using a grapheme classifier according to some implementations of the disclosure. Each of methods 300, 400, and 500 can be performed by processing logic that may comprise hardware (e.g., circuitry, dedicated logic, programmable logic, microcode, etc.), software (such as instructions run on a processing device), firmware, or a combination thereof. In one implementation, methods 300, 400, and 500 may be performed by a processing device (e.g. a processing device 802 of FIG. 8) of a computing device 110 and/or a server machine 150 as described in connection with FIG. 1.

Referring to FIG. 3, method 300 may begin at block 310 where the processing device can train an initial classifier using training data. The initial classifier is trained to be able to recognize a plurality of graphemes. Each of the grapheme may be a grapheme of a plurality of graphemes to be recognized by the grapheme classifier. In some embodiments, the graphemes may correspond to graphemes of an alphabet of one language (e.g., all of the graphemes of the alphabet). In another implementation, the graphemes may correspond to multiple alphabets of multiple languages.

The training data to train the initial classifier may include a first training set of grapheme images as training inputs and corresponding grapheme identifiers (specifying known graphemes) as target outputs for the training inputs. The training data may also include an association between each training input (grapheme image) and one or more respective outputs (one or more identifiers of known graphemes). In one implementation, the known graphemes may be graphemes of an alphabet of a language. In another implementation, the known graphemes may include graphemes of multiple languages (e.g., Chinese, Japanese, English, etc.). The initial classifier may be, for example, a single-level differential classifier or a neural network. The initial classifier can be trained on the training data using loss functions for classification. In some implementations, the goal of such training is not to achieve high accuracy or high speed in recognizing graphemes, but rather to train the initial classifier to be able to derive features representative of each grapheme class, which subsequently can be used to arrange classes with close values of features in one cluster. In some embodiments, the initial classifier may be trained by performing one or more operations described in connection with FIG. 2.

At block 320, the processing device can obtain, based on the initial classifier, a feature extractor for extracting features of grapheme images. For example, the processing device can obtain the feature extractor by removing the last layer of the initial classifier from the initial classifier. The last layer of the initial classifier may be a fully-connected layer. The last layer of the initial classifier may be an output layer that is configured to generate an output of the initial classifier (e.g., the output layer 229 of FIG. 2). As described in connection with FIGS. 1 and 2, the first layer of the initial classifier may be configured to receive an input image including a grapheme. The penultimate layer of the initial classifier may include multiple nodes. Each of the nodes of the penultimate layer may correspond to one of the features used by the initial classifier to recognize the grapheme. The number of the nodes of the penultimate layer may equal the number of the features. The output of the penultimate layer may be a feature vector representative of features of the input image. The last layer of the initial classifier may include a plurality of nodes. Each of the nodes of the last layer may correspond to a response for one or more graphemes to be recognized by the grapheme classifier. The output of the initial classifier may be a class or probabilities of the classes that best describe the input image. As such, removing the last layer of the initial classifier may produce a neural network that outputs a feature vector representing features of the grapheme in the input image.

At block 330, the processing device can generate, using the feature extractor, a plurality of feature vectors representing features of all known graphemes to be recognized by the grapheme classifier. A respective feature vector may be generated for each of the graphemes and/or the grapheme classes. Each of the features may be and/or include any feature (e.g., variable) that can be used to recognize one or more graphemes in a grapheme image (e.g., a feature that can be used to classify the grapheme image into a particular class). In some embodiments, each of the feature vectors may represent one or more features that may be used to classify a grapheme image into a class and/or to perform character recognition in accordance with the present disclosure.

The feature vectors may be generated in any suitable manner. For example, the processing device may select a training grapheme image assigned to a particular grapheme class as a representative grapheme image of the grapheme class. The processing device can process the representative grapheme image using the feature extractor. The feature extractor then produces a feature vector based on the representative grapheme image. As another example, the processing device can identify, for a respective grapheme class, a plurality of training grapheme images assigned to the respective grapheme class (e.g., obtaining grapheme images with a particular grapheme identifier that identifies the respective grapheme class). The processing device can then use the feature extractor to process the plurality of training grapheme images to generate a plurality of initial feature vectors. The processing device can then generate a feature vector for the respective grapheme class (e.g., by determining an average value of the initial feature vectors). This may give a more generalized result that takes into account possible variations in training images representing the graphemes representations. As still another example, the processing device can use the directions of the feature vectors from the last layer of the initial classifier as the feature vectors.

At block 340, the processing device can generate a first plurality of grapheme clusters by clustering the feature vectors. Each of the grapheme clusters may include a set of graphemes that are regarded as being similar to each other (e.g., graphically close). The first plurality of grapheme clusters may correspond to a first plurality of sets of graphemes (e.g., grapheme clusters 711A, 711B, and 711X as illustrated in FIG. 7). In some embodiments, the feature vectors clustered into a particular grapheme cluster may be regarded as being more similar to each other than to those in other grapheme clusters. The feature vectors for the graphemes of one grapheme cluster may be directed in the same direction or approximately the same direction. The graphemes from one grapheme cluster may be recognizable by a classifier based on a convolutional neural network. In some embodiments, the processing device may determine that a grapheme is classified into multiple grapheme clusters (e.g., by determining that multiple training images including the grapheme are classified into the multiple grapheme clusters). The processing device can attribute the grapheme(s) of the training grapheme image to a cluster that contains more representatives (e.g., more training grapheme images). The clustering may be performed using any suitable clustering algorithm, such as the K-means method.

At block 350, the processing device can train a network selector to recognize the first plurality of grapheme clusters. For example, upon receiving an input grapheme image including an unknown grapheme (e.g., a grapheme to be recognized), the trained network selector can determine one of the grapheme clusters that the unknown grapheme belongs to. The processing device can train the network selector using one or more training grapheme images of the first training set as described above in connection with FIG. 1. The network selector may operate as a first-level classifier of a grapheme classifier in accordance with various embodiments of the present disclosure.

Referring to FIG. 4, method 400 begins at block 410 where a processing device can process a second training set of grapheme images using a first-level classifier of a grapheme classifier. The first-level classifier may include the network selector as generated at block 350 of FIG. 3. The processing device can classify each training grapheme image in the second training set into one or more of the first plurality of grapheme clusters. The second training set of grapheme images may include one or more grapheme images. Each of the grapheme images in the second training data set may include one or more known graphemes. The second training set of grapheme images may be different from the first training set of grapheme images in some embodiments.

At block 420, the processing device can collect statistical data about the processing of the second training set of grapheme images by the first-level classifier. The statistical data may include any suitable data about the processing of the second training set of grapheme images by the network selector. For example, the statistical data may include data about an erroneous assignment of a particular training grapheme image in the second training set (e.g., a first training grapheme image) to a particular grapheme cluster of the first plurality of cluster graphemes. The particular training grapheme image may be regarded as being erroneously assigned to the particular grapheme cluster when the particular grapheme cluster comprises a set of graphemes that does not include the particular grapheme. The statistical data may include the number of erroneous assignments of training grapheme images related to a certain grapheme to the particular grapheme cluster, an error rate of the erroneous assignments (e.g., a ratio of the erroneous assignments to the total number of training grapheme images including the particular grapheme), etc.

At block 430, the processing device can generate a second plurality of grapheme clusters based on the statistical data. Each of the second plurality of grapheme clusters may include a set of graphemes that are regarded as being close to each other. The second plurality of grapheme clusters may correspond to a second plurality of sets of graphemes. The second plurality of sets of graphemes may represent extended sets of the first plurality of sets of graphemes. For example, the processing device can expand a first set of graphemes of the first plurality sets of graphemes to include one or more additional graphemes based on the statistical data. In one implementation, the processing device can determine that a rate of images of a given grapheme that are erroneously assigned to the first set of graphemes based on the statistical data (e.g., by determining a percentage of training grapheme images including the given grapheme erroneously assigned to the first set of graphemes by the first-level classifier). The processing device can further determine that the rate is greater than a threshold. The processing device can then add the given grapheme into the first set of graphemes to generate an expanded set of graphemes. As an example, grapheme clusters 711A, 711B, and 711X as illustrated in FIG. 7 may be expanded to expanded grapheme clusters 712A, 712B, and 712X, respectively.

At block 440, the processing device can train a respective classifier to recognize each of the second plurality of grapheme clusters. A plurality of differential classifiers may be trained for the second plurality of grapheme clusters and may operate as the second-level classifiers of the grapheme classifier. The plurality of second-level classifiers may be trained, for example, using the first training set of grapheme images as described above in connection with FIG. 1. The combination of the trained first-level classifier and the trained second-level classifiers may be used as a grapheme classifier suitable for character recognition of images including text in any language and can be trained automatically.

Referring to FIG. 5, method 500 can start at block 510 where a processing device can receive an input grapheme image. The input grapheme image may be any image that includes one or more unknown graphemes to be recognized. At block 520, the processing device can identify a grapheme cluster for the input grapheme image using a first-level classifier of a grapheme classifier. For example, the first-level classifier can process the input grapheme image to classify the input grapheme image into one of a plurality of grapheme clusters (e.g., the second plurality of grapheme clusters as described above).

At block 530, the processing device can select a classifier from a plurality of second-level classifiers of the grapheme classifier, based on the identified grapheme cluster. Each of the second-level classifiers may be configured to recognize graphemes of a respective grapheme cluster. The processing device can select the classifier of the second-level classifiers that is configured to recognize graphemes of the grapheme cluster identified at block 520.

At block 540, the processing device can process the input grapheme image using the selected classifier. For example, the selected classifier can recognize one or more graphemes in the input grapheme image. The selected classifier can also generate one or more recognition results as the results of the recognition of the input grapheme image. Each of the recognition results may include one or more of the recognized graphemes.

Figure 6A:
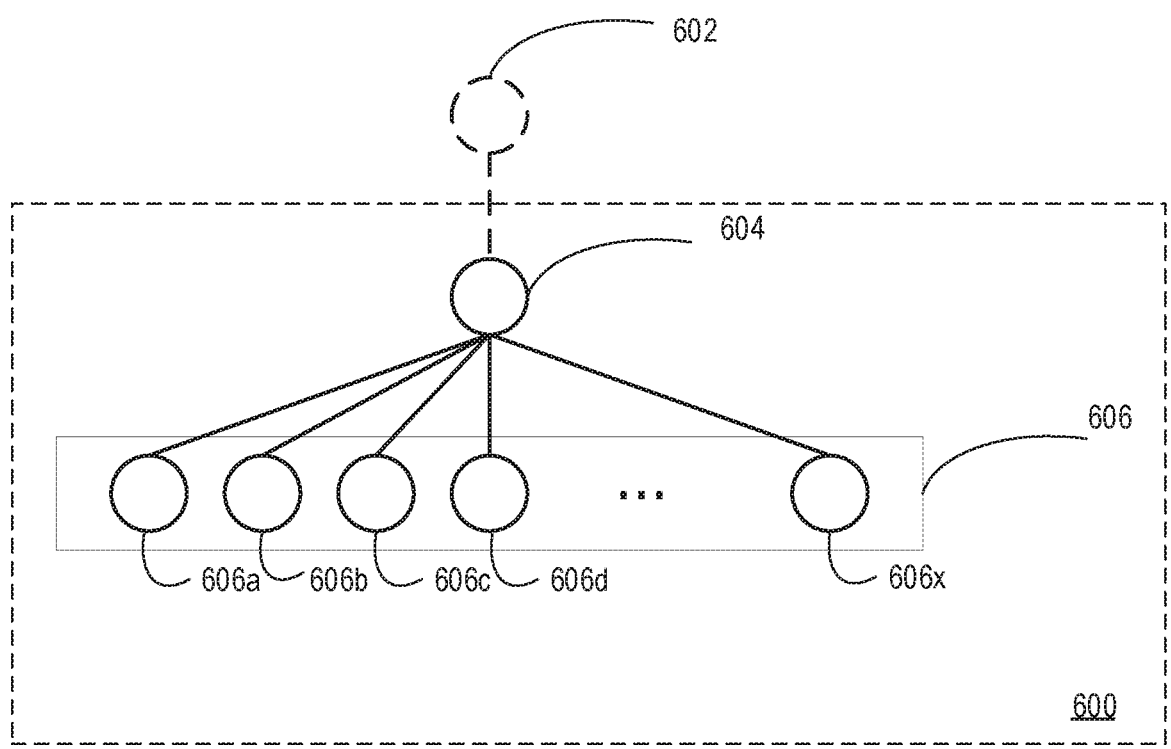
FIG. 6A schematically depicts an example of a grapheme classifier in accordance with one implementation of the present disclosure.

FIG. 6A schematically depicts an example 600 of a grapheme classifier in accordance with one implementation of the present disclosure. The grapheme classifier 600 can perform two-tier classification for recognizing text (e.g., characters) in an image.

As shown, the grapheme classifier 600 may include a first-level classifier 604 and a plurality of second-level classifiers 606 (e.g., classifiers 606a, 606b, 606c, 606d, ..., 606x). An initial classifier 602 may be trained as described above in connection with FIGS. 1-3. The initial classifier 602 may be used to train the first-level classifier 604. For example, the initial classifier 602 can divide a plurality of graphemes into a plurality of grapheme clusters (e.g., by clustering feature vectors representative of features of training images including the graphemes). Each of the grapheme clusters may include a set of graphemes that are regarded as being similar to each other. The grapheme clusters may correspond to a first plurality of sets of graphemes. The first-level classifier 604 may be trained to recognize the first plurality of sets of graphemes. For example, the first-level classifier 604 may be trained using a first training set of grapheme images and may classify images of all known graphemes into one of the grapheme clusters (e.g., one of the first plurality of sets of graphemes). The trained first-level classifier 604 can process a second training set of grapheme images. The grapheme clusters may be expanded to include a second plurality of sets of graphemes based on statistic data about the processing of the second training set of graphemes (e.g., by performing block 430 of FIG. 4). A differential classifier can then be trained to recognize one of the second plurality of sets of graphemes (e.g., the graphemes of one of the expanded grapheme clusters). For example, the classifiers 606a through 606x may be generated. The combination of the classifiers 606a through 606x may represent the second level of classification 606 of the grapheme classifier.

In some embodiments, one or more of the second plurality of grapheme clusters may be regarded as being significantly large (e.g., containing a threshold number of graphemes, significantly larger than other grapheme clusters, etc.). This may reduce the processing speed of the second-level classification 606. In some embodiments, some of the second-level classifiers may not achieve a desired quality of character recognition. In such embodiments, one or more additional layers of the grapheme classifier may be constructed to allocate sub-clusters. For example, a third layer of the grapheme classifier may be constructed to provide a third level classification. In this case, the final recognition result of the grapheme classifier may be generated by the third layer of the grapheme classifier. Graphemes of the other sets will still be recognized at the second level. In this way, an additional classification level can be added to the model locally. Additional layers can be added to the grapheme classifier by implementing the above process iteratively. This may enable local substitution of the grapheme classifier at the second level and allows to adjust the speed and quality of recognition and to create the optimal hierarchical classifier for character recognition.

Figure 6B:
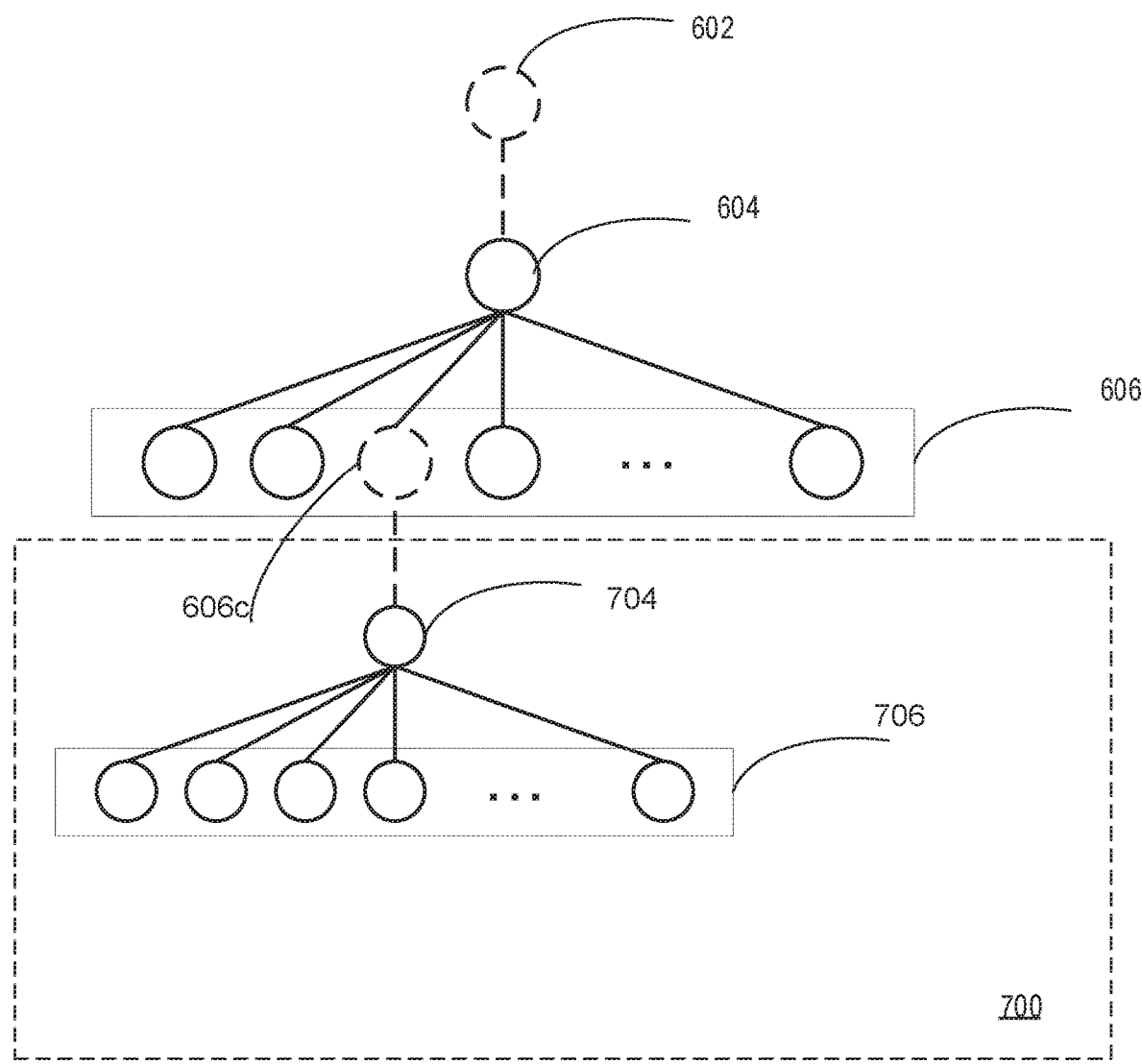
FIG. 6B schematically depicts an example of a grapheme classifier in accordance with another implementation of the present disclosure.

FIG. 6B schematically shows a hierarchical classification model in accordance with some embodiments of the present disclosure. As shown, a second-level classifier 606c as described in connection with FIG. 6A may be replaced by a classifier 700. The classifier 606c can be used as an initial classifier trained to recognize graphemes of the grapheme cluster on which the classifier 606c was trained (also referred to as the "first extended grapheme cluster"). The initial classifier may be used to generate a feature extractor as described in connection with block 320 of FIG. 3. The operations described in connection with FIGS. 3-4 may then be performed to construct a two-level classifier 700 based on the initial classifier 606c. The two-level classifier 700 can include a first-level classifier 704 that is trained to recognize a plurality of sub-clusters of the first extended grapheme cluster. Each of the sub-clusters may include a subset of the graphemes of first extended grapheme cluster. The two-level classifier 700 may also elude a plurality of additional-level classifiers 706 that may be trained based on h first-level classifier 704 by performing one or more operations as described in connection with FIG. 4. Each of the additional-level classifiers 706 may be trained to recognize graphemes of a respective sub-cluster of the sub-clusters.

The classifier 606c can then be replaced by the two-level classifier 700 to construct a grapheme classifier in accordance with the present disclosure. Upon receiving an input grapheme image for character recognition, the first-level classifier 604 may identify a grapheme cluster for the input grapheme image as described above. In some embodiments in which the identified grapheme cluster is the first extended grapheme cluster that the classifier 606c is trained to recognize, the classifier 704 can process the input grapheme image to identify a sub-cluster of the first extended grapheme cluster for the input grapheme image. One of the classifiers 706 that is trained to recognize graphemes of the identified sub-cluster can be launched to recognize grapheme in the input grapheme image. In some embodiments, one or more of classifiers 604 and 606 can be replaced with a two-level classifier (classifier 700) as described above. As such, a hierarchical classifier for character recognition may be constructed automatically.

Figure 8:
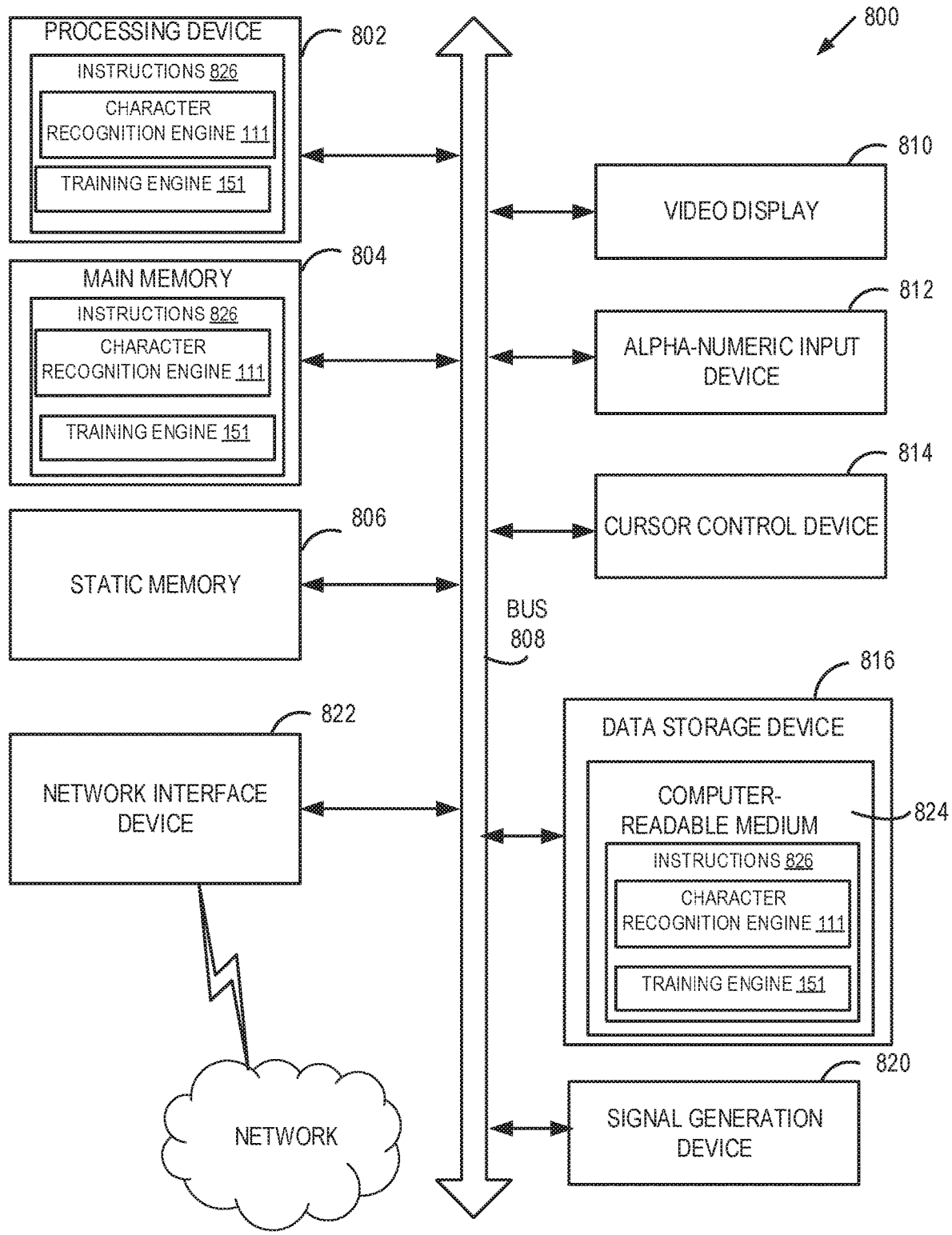
FIG. 8 illustrates a block diagram of a computer system in accordance with some implementations of the present disclosure.

FIG. 8 depicts an example computer system 800 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for implementing the character recognition engine 111 and/or the training engine 151 of FIG. 1 and to perform the operations and steps discussed herein (e.g., methods 300-500 of FIGS. 3-5).

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker). In one illustrative example, the video display unit 810, the alphanumeric input device 812, and the cursor control device 814 may be combined into a single component or device (e.g., an LCD touch screen).

The data storage device 816 may include a computer-readable medium 824 on which is stored the instructions 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting computer-readable media. In some embodiments, the instructions 826 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:

assigning, using a first-level classifier of a grapheme classifier, an input grapheme image to a first grapheme cluster of a plurality of grapheme clusters, wherein the first grapheme cluster comprises a first plurality of graphemes and wherein the plurality of grapheme clusters is generated based on statistical data associated with training a particular training set of grapheme images using the first-level classifier to recognize a first plurality of sets of graphemes;

selecting, by a processing device, a classifier from a plurality of second-level classifiers of the grapheme classifier based on the first grapheme cluster, wherein the selected classifier is trained to recognize the first plurality of graphemes; and processing the input grapheme image using the selected classifier to recognize at least one character in the input grapheme image.

2. The method of claim 1, further comprising:

replacing the selected classifier with a hierarchical classifier to construct the grapheme classifier, wherein a first level of the hierarchical classifier is configured to recognize a plurality of sub-clusters of the first grapheme cluster, and wherein a second level of the hierarchical classifier comprises a plurality of additional-level classifiers configured to recognize graphemes of a respective sub-cluster of the plurality of sub-clusters.

3. The method of claim 2, further comprising:

identifying, using the first level of the hierarchical classifier, a first sub-cluster of the first grapheme cluster for the input grapheme image, wherein the first sub-cluster comprises a first subset of the first plurality of graphemes; and recognizing, using one of the plurality of additional-level classifiers, at least one of the first subset of the first plurality of graphemes in the input grapheme image.

4. The method of claim 1, further comprising constructing, by the processing device, the grapheme classifier, wherein constructing the grapheme classifier further comprises:

generating, by the processing device, a plurality of feature vectors, wherein each of the feature vectors represents features of one grapheme of a plurality of graphemes to be recognized by the grapheme classifier;

clustering, by the processing device, the plurality of feature vectors to generate the first plurality of sets of graphemes; and training, using a first training set of grapheme images, the first-level classifier for recognizing the first plurality of sets of graphemes.

5. The method of claim 4, further comprising:

training the particular training set of grapheme images using the first-level classifier;

collecting the statistical data associated with training the particular training set of grapheme images;

generating the plurality of grapheme clusters based on the statistical data and the first plurality of sets of graphemes; and training a respective differential classifier for each of the plurality of grapheme clusters to generate the plurality of second-level classifiers.

6. The method of claim 5, wherein generating the plurality of grapheme clusters based on the statistical data comprises:

determining, based on the statistical data, an error rate of erroneous assignment of a first grapheme to a first set of graphemes of the first plurality of sets of graphemes; and in response to determining that the error rate is greater than a threshold, adding the first grapheme to the first set of graphemes to generate the first grapheme cluster.

7. The method of claim 4, further comprising:

training, using the first training set of grapheme images, an initial classifier to recognize a plurality of grapheme classes, wherein each of the plurality of grapheme classes corresponds to one grapheme of the plurality of graphemes to be recognized by the grapheme classifier;

generating a feature extractor based on the initial classifier; and generating, using the feature extractor, the plurality of feature vectors.

8. The method of claim 7, wherein generating the feature extractor based on the initial classifier comprises removing a selected layer of a plurality of layers of the initial classifier from the initial classifier, wherein the selected layer of the initial classifier is configured to generate an output of the initial classifier.

9. The method of claim 1, further comprising constructing the grapheme classifier using convolutional neural networks.

10. A system comprising:

a memory; and a processing device operatively coupled to the memory, the processing device to:

assign, using a first-level classifier of a grapheme classifier, an input grapheme image to a first grapheme cluster of a plurality of grapheme clusters, wherein the first grapheme cluster comprises a first plurality of graphemes and wherein the plurality of grapheme clusters is generated based on statistical data associated with training a particular training set of grapheme images using the first-level classifier to recognize a first plurality of sets of graphemes;

select a classifier from a plurality of second-level classifiers of the grapheme classifier based on the first grapheme cluster, wherein the selected classifier is trained to recognize the first plurality of graphemes; and process the input grapheme image using the selected classifier to recognize at least one character in the input grapheme image.

11. The system of claim 10, wherein the processing device is further to:

replace the selected classifier with a hierarchical classifier to construct the grapheme classifier, wherein a first level of the hierarchical classifier is configured to recognize a plurality of sub-clusters of the first grapheme cluster, and wherein a second level of the hierarchical classifier comprises a plurality of additional-level classifiers configured to recognize graphemes of a respective sub-cluster of the plurality of sub-clusters.

12. The system of claim 11, wherein the processing device is further to:

identify, using the first level of the hierarchical classifier, a first sub-cluster of the first grapheme cluster for the input grapheme image, wherein the first sub-cluster comprises a first subset of the first plurality of graphemes; and recognize, using one of the plurality of additional-level classifiers, at least one of the first subset of the first plurality of graphemes in the input grapheme image.

13. The system of claim 10, wherein to construct the grapheme classifier, the processing device is further to:

generate a plurality of feature vectors, wherein each of the feature vectors represents features of one grapheme of a plurality of graphemes to be recognized by the grapheme classifier;

cluster the plurality of feature vectors to generate the first plurality of sets of graphemes; and train using a first training set of grapheme images, the first-level classifier for recognizing the first plurality of sets of graphemes.

14. The system of claim 13, wherein the processing device is further to:

train the particular training set of grapheme images using the first-level classifier;

collect the statistical data associated with training the particular training set of grapheme images;

generate the plurality of grapheme clusters based on the statistical data and the first plurality of sets of graphemes; and train a respective differential classifier for each of the plurality of grapheme clusters to generate the plurality of second-level classifiers.

15. The system of claim 14, wherein, to generate the plurality of grapheme clusters based on the statistical data, the processing device is further to:

determine, based on the statistical data, an error rate of erroneous assignment of a first grapheme to a first set of graphemes of the first plurality of sets of graphemes; and in response to determining that the error rate is greater than a threshold, add the first grapheme to the first set of graphemes to generate the first grapheme cluster.

16. The system of claim 13, wherein the processing device is further to:
- train, using the first training set of grapheme images, an initial classifier to recognize a plurality of grapheme classes, wherein each of the plurality of grapheme classes corresponds to one grapheme of the plurality of graphemes to be recognized by the grapheme classifier;
- generate a feature extractor based on the initial classifier; and
- generate, using the feature extractor, the plurality of feature vectors.

17. The system of claim 16, wherein, to generate the feature extractor based on the initial classifier, the processing device is further to remove a selected layer of a plurality of layers of the initial classifier from the initial classifier, wherein the selected layer of the initial classifier is configured to generate an output of the initial classifier.

18. The system of claim 10, wherein the processing device is further to construct the grapheme classifier using convolutional neural networks.

19. A non-transitory machine-readable storage medium including instructions that, when accessed by a processing device, cause the processing device to:
- assign, using a first-level classifier of a grapheme classifier, an input grapheme image to a first grapheme cluster of a plurality of grapheme clusters, wherein the first grapheme cluster comprises a first plurality of graphemes and wherein the plurality of grapheme clusters is generated based on statistical data associated with training a particular training set of grapheme images using the first-level classifier to recognize a first plurality of sets of graphemes;
- select a classifier from a plurality of second-level classifiers of the grapheme classifier based on the first grapheme cluster, wherein the selected classifier is trained to recognize the first plurality of graphemes; and
- process the input grapheme image using the selected classifier to recognize at least one character in the input grapheme image.

20. The non-transitory machine-readable storage medium of claim 19, wherein the processing device is further to:
- replace the selected classifier with a hierarchical classifier to construct the grapheme classifier, wherein a first level of the hierarchical classifier is configured to recognize a plurality of sub-clusters of the first grapheme cluster, and wherein a second level of the hierarchical classifier comprises a plurality of additional-level classifiers configured to recognize graphemes of a respective sub-cluster of the plurality of sub-clusters;
- identify, using the first level of the hierarchical classifier, a first sub-cluster of the first grapheme cluster for the input grapheme image, wherein the first sub-cluster comprises a first subset of the first plurality of graphemes; and
- recognize, using one of the plurality of additional-level classifiers, at least one of the first subset of the first plurality of graphemes in the input grapheme image.

* * * * *